Oct. 21, 1947.  C. VAN NESS  2,429,282
COOKING UTENSIL
Filed Dec. 13, 1945
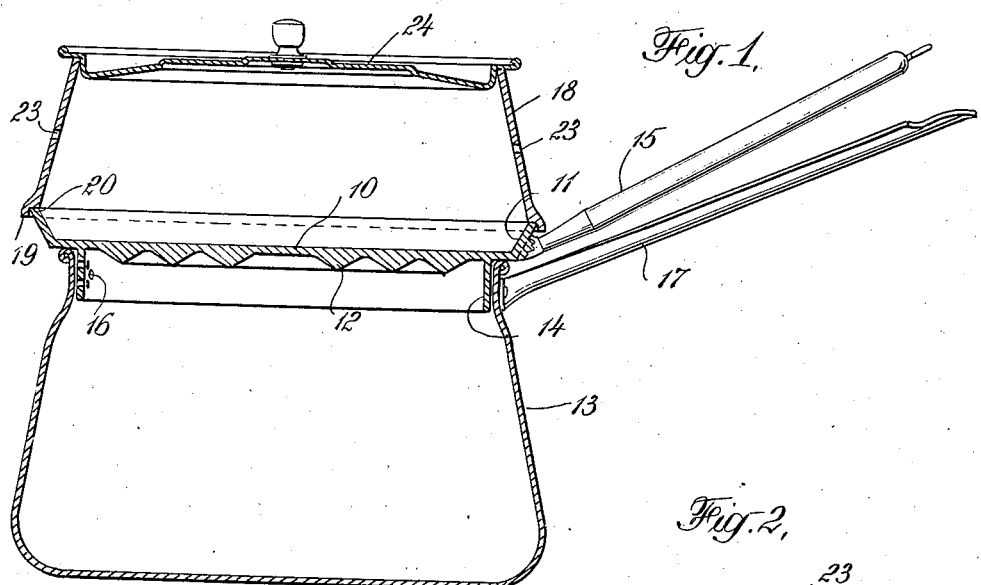
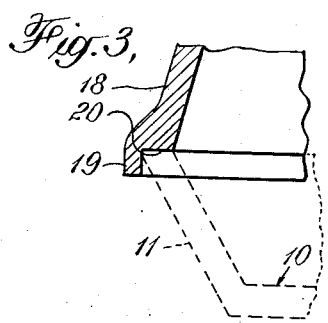
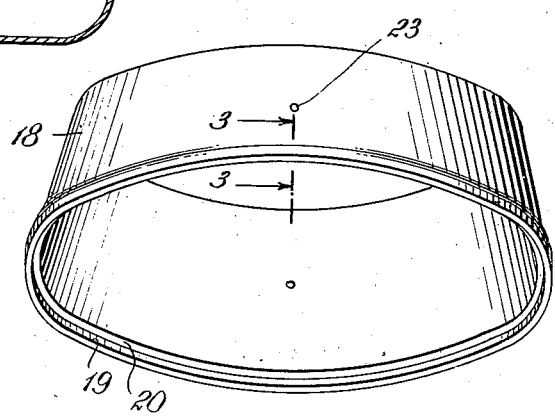
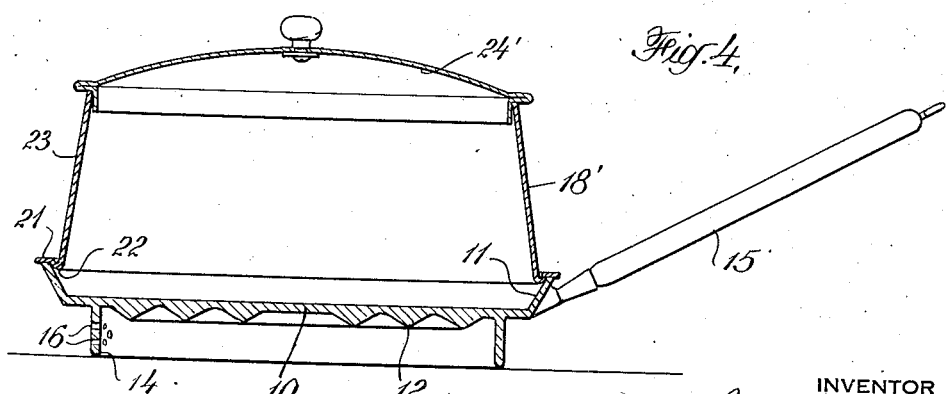
INVENTOR
Cornelius Van Ness
BY
Pennie Davis Marvin Edmonds
ATTORNEYS Patented Oct. 21, 1947

2,429,282

UNITED STATES PATENT OFFICE 2,429,282

COOKING UTENSIL

Cornelius Van Ness, New Canaan, Conn.

Application December 13, 1945, Serial No. 634,644

1 Claim. (Cl. 99—340)

This invention relates to cooking utensils and is concerned more particularly with a novel utensil which may either be employed alone for carrying on a single cooking operation, such as frying, or be utilized in combination with other utensils of a standard type for carrying on a number of different cooking operations simultaneously.

In my patent Reissue No. 21,688, I disclosed a utensil which may be used either as a frying pan or skillet or as the cover or top for a pot or similar vessel. The new utensil includes that of the patent together with other parts and provides a chamber or oven, in which food may be cooked or kept warm by means of heat derived directly from a burner, heating coil, etc., or from steam evolved from a cooking operation being carried on in a vessel, for which the new utensil serves as a cover.

For a better understanding of the invention, reference may be made to the accompanying drawing, in which Fig. 1 is a vertical sectional view showing the new utensil applied to a pot;

Fig. 2 is a perspective view of a part of the new utensil;

Fig. 3 is a sectional view on the line 3—3 of Fig. 2; and

Fig. 4 is a view similar to Fig. 1 showing a modified form of the new utensil employed alone.

The new utensil in the form illustrated includes a plate 10 of any suitable metal, such as aluminum, and preferably of circular form. The plate has a flat top and is provided with a peripheral flange 11, which extends upwardly and outwardly and has a flat surfaced rim. The plate may, if desired, be formed with concentric corrugations 12 on its under surface to provide additional metal which serves to stiffen the plate against warping.

The plate is intended in one application to be mounted on top of a standard pot 13 or similar vessel and, to hold the plate in place, it is provided with mounting means projecting downwardly from its under surface and lying inwardly from its periphery. Such mounting means are to be received in the open end of the vessel and may take the form of spaced lugs of appropriate outline, ordinarily circular, although I prefer to use a circular flange 14, which has an outer diameter somewhat less than the inner diameter of the opening in the pot and is of sufficient length to extend into the neck of the pot a substantial distance.

The plate has a handle 15 attached to a projection on the outer surface of flange 11 below the top thereof and the circular flange 14, when used, is provided with draw holes 16 opposite the handle. With this arrangement, the handle 15 may be brought into alignment with the handle 17 on the pot and the handles squeezed together slightly to tilt the plate on the pot, so that the draw holes are exposed. The pot can then be tipped to permit liquid within it to escape, while the plate retains the solid parts of the pot contents.

A hollow member 18 of any suitable metal, such as aluminum, is mounted on the peripheral flange of the plate, and the member is provided with means engaging the flange to hold the member against lateral displacement. Such holding means may take various forms, as, for example, the member shown in Figs. 1 to 3 is provided with a downwardly projecting peripheral flange 19 which is of larger internal diameter than the outer diameter of the flange 11. Inwardly from flange 19 the member is formed with a circumferential shoulder or seat 20 and the member may be placed upon the upper edge of flange 11 with the latter in contact with the seat and the flange 19 overlapping flange 11. If preferred, a member 18', shown in Fig. 4, may be used, this member having a radially directed flange 21 at its lower end. The under surface of flange 21 forms a seat adapted to rest upon the top of flange 11, the member being held in place by a downwardly extending circumferential bead 22 lying inwardly from the flange. Both forms of the hollow member are preferably provided with one or more vents 23.

The hollow member forms the vertical wall of an oven or warming chamber, which is of any suitable height and is closed at the top by a removable cover of appropriate form, such as those designated 24 or 24'. In order that a housewife may obtain the advantages of the new utensil at the last expense, the opening at the top of the member may be made circular and of an inner diameter substantially the same as that of the neck of the pot with which the new utensil is to be used. The upper end of the oven may then be closed by the cover used for the pot, so that the only parts of the new utensil that need ordinarily be purchased are the plate 10 and the hollow member 18. As the hollow member has openings of different diameter at opposite ends, it is preferably frustoconical in form, since a member of that shape may be easily cleaned.

In the use of the new utensil, it may be placed on the neck of a pot, in which vegetables are being cooked, for example, and food to be cooked or kept warm may be placed on the top of plate 10, within the oven chamber. The food within the oven is heated by heat taken up by the plate 10 and its flange 13 from the steam rising from the fluid within the pot. The contents of the oven are thus heated in the same manner as in a double boiler and the temperature, to which they are subjected, does not rise above 212° F.

In some cooking operations, it may be desirable to heat food placed within the oven of the new utensil to a temperature in excess of 212° F. and, in that event, the plate 10 may be placed over a gas burner or electric heating coil or on top of a kitchen range. In such use, the flange 14 keeps the plate slightly elevated, so that the food resting on the upper surface of the plate is evenly heated. If desired, the new utensil may be placed in the oven of the stove, as, for example, for roasting meat.

The new utensil provides the housewife with an additional piece of cooking equipment at small expense and, by its use, she may carry on a number of cooking operations simultaneously. The utensil is of wide utility in that it performs the functions of a double boiler, a roasting pan, a spider, and a warming chamber, and, since the parts are all of simple construction, they are easy to keep clean.

The utensils disclosed include a hollow member 18 of frusto-conical form and this shape is preferred in that the inner diameter of the top may then be approximately the same as the outer diameter of the flange 14. That flange is of a size to fit into a standard pot and, when the top of the hollow member is of about the same diameter as the flange, the top supplied with the pot may be used to close the upper end of the hollow member. If desired, however, the member 18 may be of substantially cylindrical form and the utensil may either be provided with its own top for closing the hollow member or the diameter of the member 18 may be the same as that of a pot of standard size, usually the next larger size than that with which the plate and hollow member are intended to be used.

I claim:

A cooking utensil comprising a pot having an open upper end, a plate of greater size than the open end of the pot, an endless flange projecting downwardly from the undersurface of said plate and spaced inwardly from the periphery of the plate, said plate being mounted on the pot with the undersurface thereof between said flange and its periphery resting on the edge of the pot defining the opening therein, said flange extending downwardly into the pot a distance sufficient to prevent lateral displacement of the plate from the pot, said plate also having a peripheral flange extending upwardly and outwardly therefrom of such dimensions as to enable said plate to be used as a frying pan, a hollow, upwardly-tapering frusto-conical member mounted on the upper peripheral edge of the flange which extends upwardly from the periphery of said plate, the lower edge portion of said member being formed to so engage said upper peripheral edge of said flange as to prevent lateral displacement of said member therefrom, the upper end of said member having an internal diameter substantially the same as that of the opening in the pot, and a cover closing the upper end of said member and having a depressed portion entering said end to hold the cover against lateral displacement, said cover, by reason of the internal diameters of the upper end of said member, and the opening in the pot being substantially the same, being also usable to close the opening in the pot when said plate is removed therefrom.

CORNELIUS VAN NESS.

REFERENCES CITED

The following references are of record in the file of this patent:

UNITED STATES PATENTS

| Number | Name | Date |
|---|---|---|
| Re. 21,688 | Van Ness | Jan. 7, 1941 |
| 1,736,223 | Silen | Nov. 19, 1929 |
| 2,413,204 | Wolff | Dec. 24, 1946 |

FOREIGN PATENTS

| Number | Country | Date |
|---|---|---|
| 10,581 | Australia | Dec. 18, 1933 |
| 337,158 | France | Feb. 8, 1904 |
| 662,604 | Germany | July 16, 1938 |
| 833,229 | France | July 18, 1938 |